June 14, 1927.  
F. LERNER  
PAPER CUTTING MACHINE  
Filed May 9, 1925  
1,632,378  
6 Sheets-Sheet 1
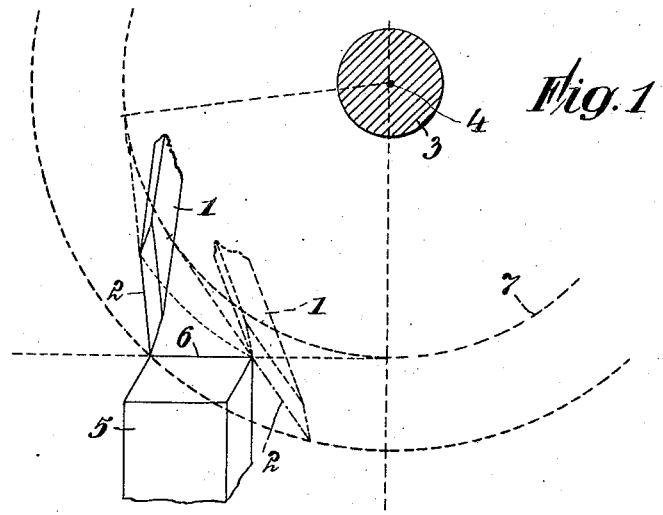
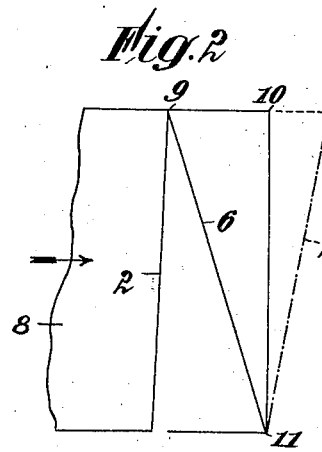
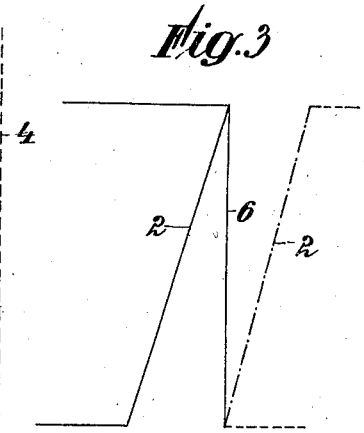
Inventor  
F. Lerner June 14, 1927. 1,632,378

F. LERNER

PAPER CUTTING MACHINE

Filed May 9, 1925 6 Sheets-Sheet 2

Inventor
F. Lerner
by Langner, Parry, Card & Langner
Att'ys.

June 14, 1927.
F. LERNER
1,632,378
PAPER CUTTING MACHINE
Filed May 9, 1925
6 Sheets-Sheet 3
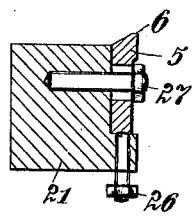
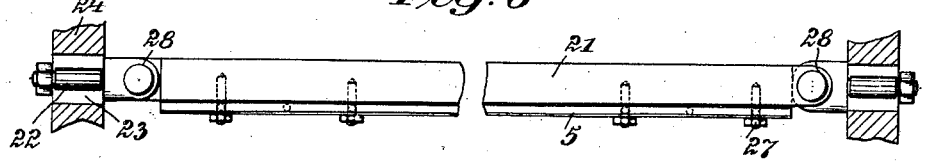
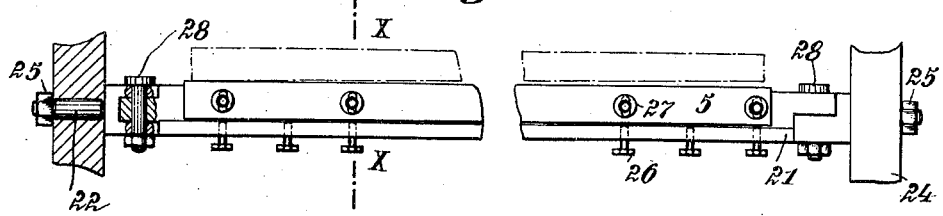

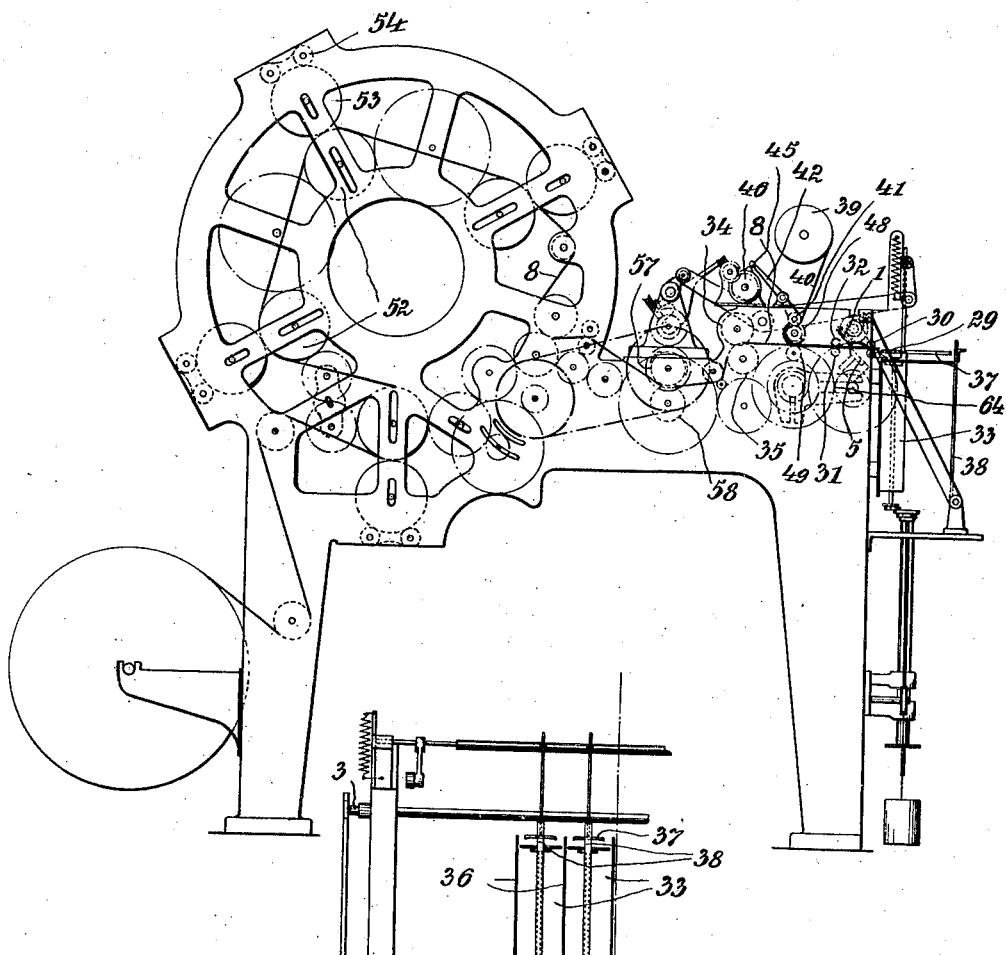

June 14, 1927.　　　　F. LERNER　　　　1,632,378
PAPER CUTTING MACHINE
Filed May 9, 1925　　　　6 Sheets-Sheet 5

Inventor
F. Lerner
by Langner, Parry, Card & Langner
Atty's

June 14, 1927.
F. LERNER
1,632,378
PAPER CUTTING MACHINE
Filed May 9, 1925     6 Sheets-Sheet 6
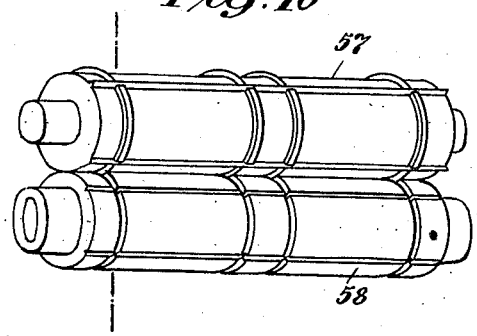
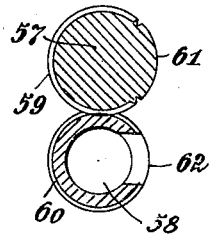
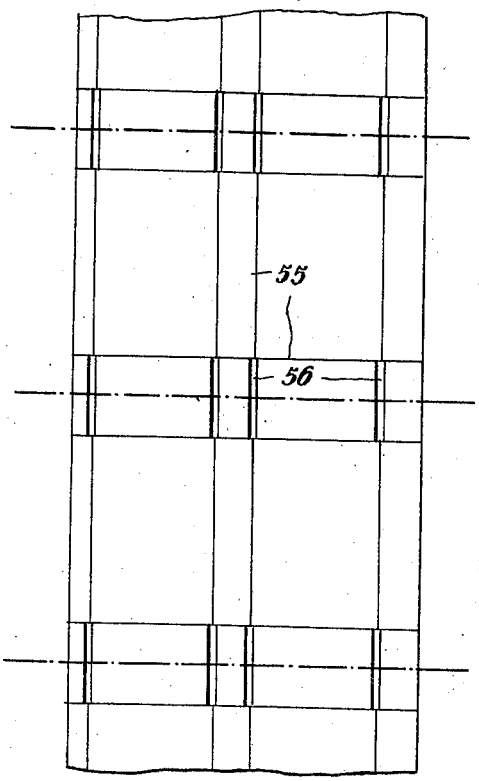
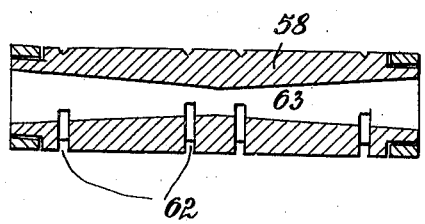
Inventor
F. Lerner
by Langner, Parry, Card & Langner
Atty's

Patented June 14, 1927.

1,632,378

UNITED STATES PATENT OFFICE.

FRIEDRICH LERNER, OF VIENNA, AUSTRIA.

PAPER-CUTTING MACHINE.

Application filed May 9, 1925, Serial No. 29,095, and in Austria May 15, 1924.

My invention relates to machines for cutting bands of paper into substantially rectangular pieces of predetermined dimensions by cutting such bands longitudinally by means of cutters of any known or preferred construction into strips of any desired width and in subsequently cutting transversely such strips into pieces or sheets of any desired length. If desired from the paper band certain parts may be punched out in order to obtain blanks for making paper boxes.

My improved machine is more particularly designed for rapidly and cheaply manufacturing cigarette paper, tickets, forms and sheets of writing paper from paper bands.

The object of my invention is to provide a machine of the class indicated which is exact and reliable in operation and readily adjustable for any size and more particularly for any length of the rectangular pieces or sheets cut, as also for any speed of the paper. Furthermore my improved machine is designed to automatically deposit the pieces or sheets cut into boxes. Incidentally my improved machine may be provided with punching apparatus for punching from the bands or from the longitudinal strips into which it is cut certain parts for obtaining blanks for manufacturing paper boxes or wrappers.

With these objects in view my invention consists in the first place in an improved construction of the transverse cutter. This transverse cutter consists of a rotary knife the edge of which crosses its axis of rotation and therefore constitutes in any position a generatrix of one set of generatrices of a hyperboloid of revolution, and a stationary knife the edge of which constitutes one of the generatrices of the other set of generatrices of the same hyperboloid. By this arrangement the knife edges are caused to come into proper contact with each other and make a clean rectilinear cut without tearing or otherwise injuring the paper as hereinafter more fully explained.

Furthermore my invention consists in a combination of the transverse cutter just referred to, with adjusting means for permitting them to be nicely adjusted for any speeds and for any lengths of the paper pieces or sheets and also with rollers arranged in rear of the cutter which catch hold of the paper and hold it under tension before it is cut transversely; of a combination of the transverse cutter with boxes for receiving the cut pieces or sheets and with means for nicely superposing such pieces in the said boxes; of a combination of the said transverse cutter with mechanism for printing the paper strip or band while being fed to the transverse cutter and for punching out of the latter certain parts if desired and for automatically removing the punches so punched out; and of a combination of the said cutters with means for intermittently feeding thereto additional strips or an additional band to be cut into pieces or sheets to be interposed between two successive main pieces or sheets after a predetermined number of the latter have been cut and superposed as above referred to.

In the annexed drawings I have shown by way of example my invention as applied to a complete machine for printing and cutting a band longitudinally into strips and for cutting such strips transversely into pieces or sheets and for depositing the latter in boxes with additional pieces or sheets of paper interposed between packages of a predetermined number of main pieces or sheets.

In the drawings Figs. 1, 2 and 3 illustrate diagrammatically the arrangement of the knife edges of the transverse cutter in front elevation, plan view and side elevation respectively in a somewhat exaggerated manner for facilitating the understanding.

Fig. 8 is a plan view partly in section and

Fig. 9 is a rear elevation of the stationary knife,

Fig. 10 is a transverse section on a larger scale on the line X, X, Fig. 9,

Fig. 11 is a side elevation partly in section,

Fig. 12 is a rear view of the most important parts of a paper cutting machine embodying my invention.

Fig. 15 is a plan view of a blank for making paper boxes or wrappers,

Fig. 16 is a perspective view of the roller for producing such blanks,

Fig. 17 is a longitudinal section of one of those rollers and

Fig. 18 is a transverse section of the two rollers.

Figure 4:
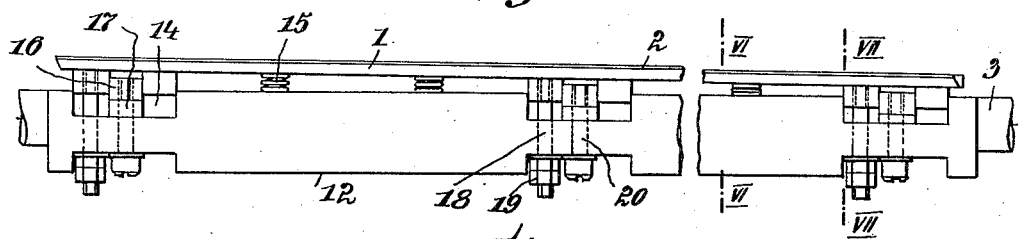
Fig. 4 is an inverted plan view.

I shall first describe the transverse cutter with reference to Figs. 1 to 3 in which for the sake of clearness only the knife edges and part of the knives are shown to avoid confusion.

My improved transverse cutter comprises a rotary knife 1 having a rectilinear edge 2 and adapted to revolve round a shaft 3, the geometrical axis of which is indicated at 4 and a stationary knife 5 having a rectilinear edge 6. The edge 2 if projected would cross the axis 4 but not intersect it and therefore in revolving round the latter it generates a hyperboloid of revolution having for its geometrical axis the axis 4; the edge 2 therefore is in any of its positions one of the generatrices of one set of generatrices of this hyperboloid. The position of the edge 6 of the stationary knife is such that this edge constitutes one of the generatrices of the other set of generatrices of the same hyperboloid of revolution. Therefore as shown in Fig. 1 the projections of the edges 2 and 6 on a plane at right angles to the axis 4 must be tangents to one and the same circle 7 concentric to the axis 4, which circle is the projection of the equator or throat of the hyperboloid on this plane. As the rectilinear generatrices of the two sets of hyperboloids intersect each other the edge 2 of the knife 1 as the latter revolves moves in exact and continuous contact with the edge 6 of the stationary knife 5 from the position shown in full lines to the position indicated in dotted lines in Figs. 1 to 3. If now a strip of paper 8 is moved with a constant speed in the direction of the arrow Fig. 2 in a plane parallel to the axis 4 and edge 6 of the stationary knife 5 and at right angles to the direction of the axis 4 first the upper edge of the paper strip enters between the two knife edges and is nicely cut owing to the exact contact between the two knife edges and as the rotary knife continues its rotary movement and the paper strip its longitudinal movement the cut is continued along the stationary knife edge 6 so that when the rotary knife edge 2 reaches the position indicated in dotted lines in Fig. 2 the paper strip is entirely cut through, the cut edge being rectilinear whenever the rotary knife and the paper strip move at constant speeds. The direction of the cut so produced relatively to the stationary knife edge and the axis 4 depends on the ratio of the angular speed of the rotary knife edge and the longitudinal speed of the paper strip, that is to say when the paper strip advances by the distance 9, 10, Fig. 2, while the point of contact between the two knife edges advances from 9 to 11 the paper strip will be cut along 9, 10, 11. By properly selecting this ratio the line 10, 11 may be made to be perpendicular to the side edge of the paper strip so that the paper strip will be cut into rectangular pieces or sheets. If one of these speeds is changed while the other remains unaltered, both speeds being uniform, the paper will be cut into pieces or sheets of lozenge or parallelogram shape. I may mention here that it has already been proposed to construct a transverse cutter consisting of a rotary knife and a stationary knife the edges of which cross the axis of rotation of the rotary knife. But up to now it has not been recognized that the edge of the stationary knife must form a generatrix of the one set and the edge of the rotary knife must form the rotary generatrix of the other set of rectilinear generatrices of one and the same hyperboloid of revolution the axis of which coincides with the axis of rotation of the rotary knife. It is this latter feature which secures a smooth cut and obviates any tearing or other injury to the paper being cut as owing to this arrangement, the edges of the two knives are positively held in contact with each other, the point of contact of the two edges moving from one end of the knives to the other as the rotary knife revolves.

Figure 5:
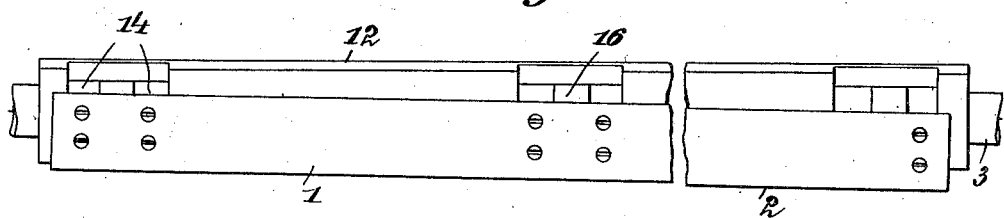
Fig. 5 is a rear elevation.
Figure 6:
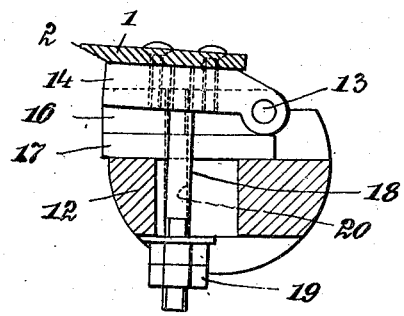
Figs. 6 and 7 are transverse sections on the lines VI, VI, and VII, VII of Fig. 4 respectively on a larger scale, Figure 7:
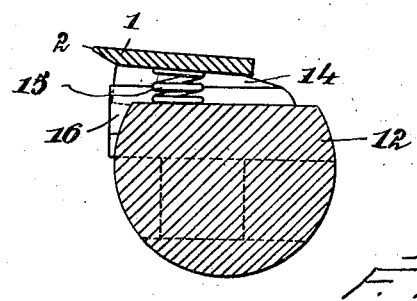

Although the two knives might be rigid without in any way interfering with the exact and smooth cut, yet I prefer for practical reasons to make the rotary knife capable of yielding for obviating any damage to the cutter in case of irregularities in the paper or by grit or other impurities coming between the knives. The construction of the rotary knife is shown in detail in Figs. 4 to 7. In these figures the shaft 3 of the rotary knife 1 carries a boss 12 in which are mounted arms 14 pivoted at 13 on blocks 16 provided with washers 17 mounted in the boss by bolts 20. The arms 14 carry the knife 1 and are rigidly connected to bolts 18 which project from the rear side of the boss and are provided with adjusting and locking nuts 19. Springs 15 tend to force the knife into the outer position which is the one above described and the outward movement of the knife is limited by the bolt 18 and nuts 19. Thus the knife may move inwards overcoming the action of the springs, whenever it meets with some obstacle and then returns automatically into its normal operation. The blocks 16 and washers serve to limit the inward movement of the knife 1.

For adjusting the knives for different ratios of angular speed of the rotary knife and of the longitudinal speeds of the paper strips, the knife 1 as a whole must be adjustable round an axis perpendicular to its plane and round an axis in its plane and parallel to the axis 4. The equivalent of the latter adjustment may be simply effected by adjusting the nuts 19. For permitting the knife to be adjusted round an axis perpendicular to its plane, the knife 1 with the arms 14 and blocks 16 are made adjustable transversely to the shaft 3 by arranging them in transverse slots in the body of the boss 12. When properly adjusted they are firmly locked in position by screwing home the nuts 19 on the bolts 20, both sets of bolts being displaceable in transverse slots of the boss 12 as shown more particularly in Fig. 6.

Furthermore for adjusting the transverse cutter for different ratios of the angular speed of the rotary knife and the longitudinal speed of the paper strip the edge 6 of the stationary knife 5 must be adjustable in a plane parallel to the geometrical axis 4 of the shaft 3 so as to vary the angle between the said edge and the projection of the axis. For this purpose the stationary knife 5 is mounted on a support 21 shown in Figs. 8 to 10, mounted in turn by means of studs 22 in transverse slots 23 of standards 24 fixed in the frame of the cutter. Preferably the support 21 is pivotally connected to the studs at 28 as shown. By adjusting the studs 22 in the slots 23 and by locking them in position by nuts 25 the angle between the projections of the axis 4 and the edge 6 on the plane in which the paper strip moves may be adjusted within sufficiently wide limits. Moreover a very nice adjustment of the distance of the edges 6 from the axis 4 is required. For this purpose the stationary knife is supported on the support 21 by bolts 26 screwed into projections of the support and is guided on the support by means of transverse bolts 27 screwed into the support 21 and passing through elongated holes in the knife 5 (Fig. 10). By means of the bolts 26 the distance between the edge 6 and the axis 4 may be very nicely adjusted whereupon the stationary knife 5 may be securely locked in position by screwing home the bolts 27 and the nuts of the bolts 26.

In order to secure a smooth cut and to reliably avoid any injury to the paper, the paper strip should be kept under proper longitudinal tension while being cut. For this purpose I provide in rear of the transverse cutter a pair of drawing off rollers 29, 30 Fig. 11 continuously revolving at a tangential speed equal to the longitudinal speed of the paper strip 8. The rollers 29, 30 are so located that they catch hold of the front edge of the paper strip and draw the latter forwards before the transverse cutter cuts through the paper strip. By these means the paper strip is kept under tension while passing from the feed rollers 31, 32 through the transverse cutter and between the drawing off rollers 29, 30 so that the transverse cutter operates on the paper strip while the latter is kept under proper tension between the feed rollers 31, 32 and the drawing off rollers 29, 30. The drawing off rollers 29, 30 deliver the pieces or sheets cut by the transverse cutter to the receiver 33 Figs. 11 and 12. This latter consists of a number of compartments, one for each strip, open on top and so arranged that the pieces or sheets coming from the drawing off rollers 29, 30 are placed on the open tops of the receiver compartments.

As the paper strips are cut by rotary paper shears 34, 35 of the usual construction comprising a pair of plane rotary discs revolving at equal speeds around axes parallel to each other and to the paper surface and slightly overlapping each other and as usually a plurality of such paper shears are arranged in proper distances apart on a shaft common to all of the pairs, the side edges of the neighbouring paper strips are in contact with each other as they leave the proper shears and pass to the feed rollers 31, 32, the transverse cutter, the drawing off rollers 29, 30 and to the receiver 33; the width of the paper strip is greater by the thickness of the partitions 36 between the neighbouring compartments of the receiver than the clear width of such compartments. Therefore in order to force the paper pieces or sheets down into the compartments of the receiver and to store them up there I use a pusher 37 for each compartment to which a reciprocating movement in the direction of the axis of the compartments is imparted from any part of the machine. The width of the pusher is less than the clear width of the compartments so that as the pusher moves into its compartment it bends and pushes the piece or sheet cut and deposited on top of such compartment into the latter, whereupon the pusher again moves out of the compartment to clear the way for the next piece or sheet of paper. Thus a pile of superposed sheets of paper is formed in the receiver compartments, which latter are emptied from time to time.

Figure 13:
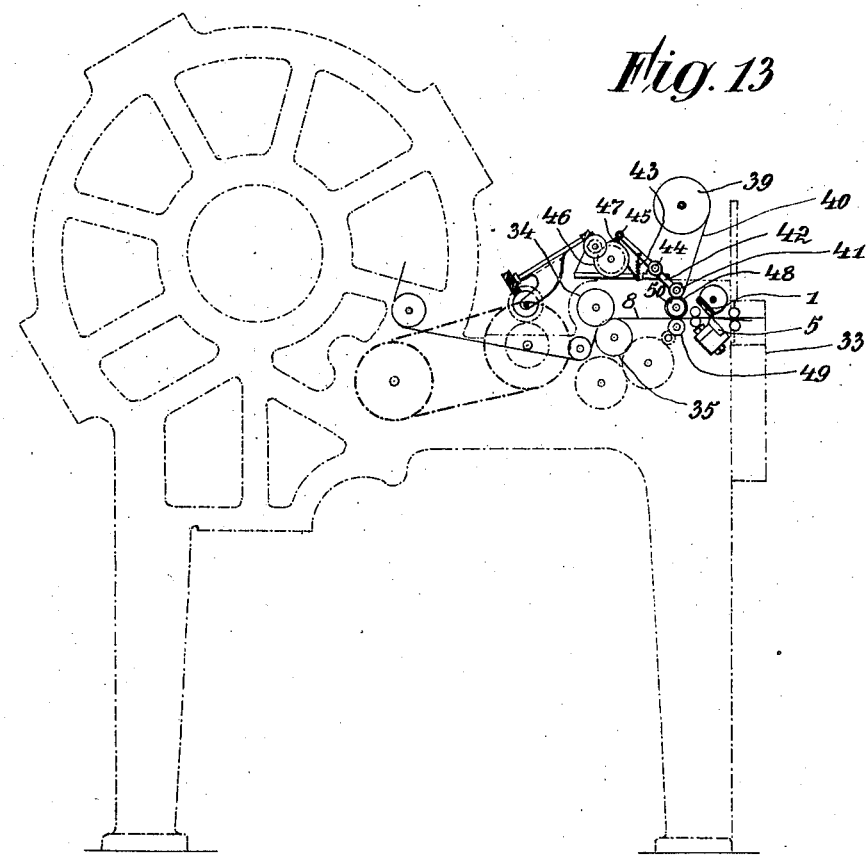
Fig. 13 is a side elevation, Fig. 14 a plan view of the device for intermittently feeding additional paper bands or sheets to the transverse cutter, Figure 14:
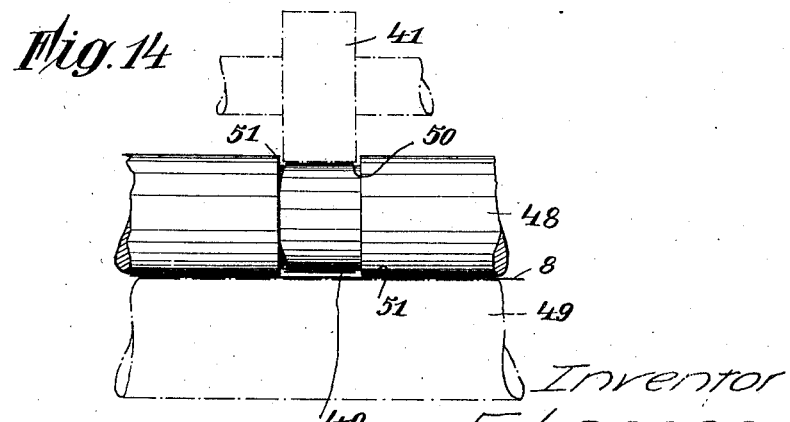

At 38 is shown a beater of any known or preferred construction to which a reciprocating movement from any moving part of the machine is imparted and which strikes against the rear wall of the receiver for nicely and snugly locating the sheets against such rear wall in the well known manner. In some cases it is desired to interpose between packages of some desired number, say 100, of superposed pieces or sheets of paper in the receiver compartments, additional sheets differing in color or size to facilitate counting and control. In such cases I provide a roller 39 on which an endless band of the paper band 40, Figs. 11, 12, 13, and 14 for the additional sheets is wound and thence passes over a rubber roller 41 which is mounted on one end of a lever 42 acted upon by a spring 43 journaled in the machine frame at 44. The other end of the lever 42 carries a bowl adapted to engage with a cam 46 mounted on a shaft journalled in the machine frame and rotated at a predetermined speed by any suitable means such as a worm gearing driven from some revolving shaft of the machine. The parts are so proportioned that as long as the bowl 45 rides on the circular part of the cam 46 the rubber roller 41 is kept out of engagement with the roller 48 which together with the roller 49 serves to feed the main paper band 8 to the cutters 34, 35. Therefore during this time the additional paper band 40 is not fed forward, but hangs loosely on the front side of the roller 48. But when the projection 47 of the cam 46 comes in front of the bowl 45 the lever 42 is turned around its fulcrum 44 by the spring 43 whereby the rubber roller 41 is pressed against the feed roller 48. The additional band 40 is there pinched between the rollers 41 and 48 and is drawn off the roller 39 and moves together with the main band 8 by the feed rollers 48 and 49. After some time sufficient to feed the required length of the additional band 40 the projection 47 has come past the bowl 45 and the lever lifts the rubber roller 41 from the feed roller 48 so as to disengage the said additional band which is thus stopped. By properly selecting the ratio of the speed of the cam 46 and the feed rollers 48 and 49 and by properly selecting the circumferential length of the projection 47 the movements of the parts just described may be readily so turned that the rollers 41 and 48 are brought into engagement with each other only once for a given length of the main band 8 fed forward by the rollers 48, 49 and for a period of time just sufficient to feed the length of the additional paper band required for the interposed additional paper pieces or sheets.

In the arrangement just described the additional paper band 40 runs together with the main band through the longitudinal cutters 34, 35. In some cases, however, I prefer to construct the roller 48 with two end shoulders 51, 51 permanently engaging with the roller 49 and a central portion 50 reduced in diameter and adapted to engage with the rubber roller 41 which then must be of such reduced length as to enter between the end shoulders 51. The additional strip 40 must then be of a correspondingly reduced width and therefore in this case the additional paper 40 must not be in the form of a band of the same width as the main paper band 8 but in the form of strips of a width less than the width of the strips into which the main paper band 8 is cut by the longitudinal cutters 34, 35. These strips are of course not cut by the longitudinal cutters 34, 35 but they are cut by the transverse cutter only. The arrangement last described is perfectly reliable even at high speeds.

The main paper to be cut is supplied from a roller not shown and on its way from such roller to the feed rollers 48, 49 it may pass through printing apparatus as shown in Figs. 11 and 12 such printing apparatus being of any known or preferred construction and comprising platen rollers 52 printing rollers 53 and inking apparatus 54.

My improved machine may also be used for manufacturing blanks for making paper boxes or wrappers such a blank being shown by way of example in Fig. 15. In the manufacture of such blanks it is necessary to press grooves 55 into the paper along which the paper band folded in making the paper box or wrapper and furthermore to remove from the band certain parts 56 by punching. This may likewise be done in the machine just described by providing in front of the feed rollers pressing and punching rollers 57, 58 Figs. 11, 12, 16, 17, 18, the upper one 57 of which is provided with longitudinal and circumferential ribs 59 cooperating with corresponding grooves 60 in the other roller 18, for pressing the grooves 55 in the paper band. Furthermore the roller 57 is provided with punching dies 61 while the other hollow roller 58 is provided with corresponding holes 62 leading into the hollow of this roller and adapted to cooperate with the punching dies 61. As the two rollers 57, 58 revolve in unison the ribs 59 and grooves produce the required grooves 55 in the paper band and the punching dies 61 and holes 62 cut out the punchings corresponding to the punchings 56 to be removed from the paper band. These punchings are thus fully separated from the paper band and forced into the hollow 63 of the roller. This hollow increases in diameter from the centre of the roller 58 towards both of its ends and thus in the rapid rotation of the roller 58 the said punchings are automatically removed from the said hollow by centrifugal force.

The advantage of this construction is that the punchings 56 are fully separated from the paper band and automatically removed so that any knocking out of the punchings from the band is obviated.

Preferably the rotary knife 1 and the paper feed rollers such as 48, 49, 31, 32, 29, 30 are driven from one and the same main driving shaft. For varying the ratio of the tangential speed of the feed rollers and consequently of the longitudinal speed of the paper strips and the angular speed of the rotary knife 1, I drive the shaft 3 of the rotary knife by means of a variable speed gear of any known or preferred construction such as 64 shown in Figs. 11 and 12. Thereby the angular speed of the rotary knife may be varied while the longitudinal speed of the paper strips remains constant. Of course the knives 1 and 5 have to be properly adjusted.

It will be understood that many of the constructional details may be varied within wide limits without departing from the essence of my invention.

The essential advantages of my invention consist in that an endless paper band longitudinally cut into strips is transversely cut into pieces or sheets without any interruption of its movement the cut being smooth and accurate as to inclination. Variations in speed of the longitudinal movement of the paper strips and of the angular speed of the rotary knife do not affect the size or shape of the pieces or sheets of paper cut as long as the ratio of the speeds remains the same.

What I claim is:

1. For a paper cutting machine a transverse cutter comprising a rotary cutter having a rectilinear edge crossing the axis of revolution and constituting in any of its positions a rectilinear generatrix of one set of a hyperboloid of revolution struck around such axis and further comprising a stationary knife having a rectilinear edge constituting a generatrix of the other set of the same hyperboloid.

2. For a paper cutting machine a transverse cutter comprising a rotary cutter having a rectilinear edge crossing the axis of revolution and constituting in any of its positions a rectilinear generatrix of one set of a hyperboloid of revolution struck around such axis and further comprising a stationary knife having a rectilinear edge constituting a generatrix of the other set of the same hyperboloid, the rotary knife being adjustable around an axis substantially perpendicular to the plane parallel to its edge and to its axis of revolution as well as around an axis in such plane, and the stationary knife being adjustable around an axis perpendicular to a plane parallel to its edge and the axis of revolution of the rotary knife and in such plane.

3. For a paper cutting machine a transverse cutter comprising a revolving shaft, a boss rigidly mounted on such shaft, means for connecting a knife having a rectilinear edge crossing the geometrical axis of the shaft and means for adjusting such knife edge relatively to the said geometrical axis in two directions substantially at right angles to each other in combination of a stationary knife, means for supporting such stationary knife and means for adjusting the edge of such stationary knife in two directions substantially at right angles of each other, the edge of the stationary knife being a generatrix of one set of the hyperboloid of revolution struck by the edge of the rotary knife around the geometrical axis of its shaft the edge of the rotary knife forming generatrices of the other set of the same hyperboloid.

4. For a paper cutting machine a transverse cutter comprising a revolving shaft, a boss rigidly mounted on such shaft, blocks and interchangeable washers adapted to be adjusted in such boss transversely to the said shaft and means for locking said blocks and washers in any adjusted position in such boss, arms journalled to such blocks and having secured to them a knife having a rectilinear edge, springs interposed between the rotary knife and the boss, and tending to force the said knife away from the boss, means for limiting the outward movement of the said journalled arms, the said blocks and washers being adapted to limit the opposite movement of the rotary knife in combination of a stationary knife, means for supporting such stationary knife and means for adjusting the edge of such stationary knife in two directions substantially at right angles of each other, the edge of the stationary knife being a generatrix of one set of the hyperboloid of revolution struck by the edge of the rotary knife around the geometrical axis of its shaft the edge of the rotary knife forming generatrices of the other set of the same hyperboloid.

5. In a paper cutting machine the combination of a transverse cutter comprising a rotary cutter having a rectilinear edge crossing the axis of revolution and constituting in any of its positions a rectilinear generatrix of one set of a hyperboloid of revolution struck around such axis and further comprising a stationary knife having a rectilinear edge constituting a generatrix of the other set of the same hyperboloid with feed rollers in front of such transverse cutter and drawing off rollers in rear of such transverse cutter, the said drawing off rollers being adapted to engage the paper strip supplied by the feed rollers before the paper strip is cut by the transverse cutter.

6. In a paper cutting machine the combination of a transverse cutter comprising a rotary cutter having a rectilinear edge crossing the axis of revolution and constituting in any of its positions a rectilinear generatrix of one set of a hyperboloid of revolution struck around such axis and further comprising a stationary knife having a rectilinear edge constituting a generatrix of the other set of the same hyperboloid, the rotary knife being adjustable around an axis substantially perpendicular to the plane parallel to its edge and to its axis of revolution as well as around an axis in such plane, and the stationary knife being adjustable around an axis perpendicular to a plane parallel to its edge and the axis of revolution of the rotary knife and in such plane with feed rollers in front of such transverse cutter and drawing off rollers in rear of such transverse cutter, the said drawing off rollers being adapted to engage the paper strip supplied by the feed rollers before the paper strip is cut by the transverse cutter.

7. In a paper cutting machine the combination of a transverse cutter comprising a rotary cutter having a rectilinear edge crossing the axis of revolution and constituting in any of its positions a rectilinear generatrix of one set of a hyperboloid of revolution struck around such axis and further comprising a stationary knife having a rectilinear edge constituting a generatrix of the other set of the same hyperboloid with continuously revolving feed rollers in front of such transverse cutter, and of continuously revolving drawing off rollers in rear of such cutter, means for continuously supplying a main paper strip to such feed rollers and means for intermittently supplying an additional paper strip to such feed rollers, such drawing off rollers being adapted to engage the paper strips supplied by the feed rollers before the paper strips are cut by the transverse cutter.

8. In a paper cutting machine the combination of a transverse cutter comprising a rotary cutter having a rectilinear edge crossing the axis of revolution and constituting in any of its positions a rectilinear generatrix of one set of a hyperboloid of revolution struck around such axis and further comprising a stationary knife having a rectilinear edge constituting a generatrix of the other set of the same hyperboloid with continuously revolving feed rollers in front of such transverse cutter and of continuously revolving drawing off rollers in rear of such cutter, means for continuously supplying a main paper strip to such feed rollers, a guide roller for an additional paper strip, means for supplying such additional paper strip to the guide roller and means for intermittently bringing into engagement the said guide roller with the continuously revolving feed roller with the additional paper strip engaged by the two rollers, the said drawing off rollers being adapted to engage the paper strips supplied by the feed rollers before the paper strips are cut by the transverse cutter.

9. In a paper cutting machine the combination of a transverse cutter comprising a rotary cutter having a rectilinear edge crossing the axis of revolution and constituting in any of its positions a rectilinear generatrix of one set of a hyperboloid of revolution struck around such axis and further comprising a stationary knife having a rectilinear edge constituting a generatrix of the other set of the same hyperboloid with continuously revolving feed rollers in front of such transverse cutter and of continuously revolving drawing off rollers in rear of such cutter, means for continuously supplying a main paper strip to such feed rollers, a guide roller for an additional paper strip, means for supplying such additional paper strip to the guide roller, a spring actuated lever journalled in the frame and carrying at one end the said guide roller and at the other end a bowl, a cam journalled in the frame and adapted to cooperate with the said bowl, whereby the said guide roller is alternately pressed against and brought out of engagement with one of the continuously revolving feed rollers, the angular speed of the said cam being a predetermined fraction of the angular speed of the last named feed roller, the said drawing off rollers being adapted to engage the paper strips supplied by the feed rollers before the paper strips are cut by the transverse cutter.

10. In a paper cutting machine the combination of a transverse cutter comprising a rotary cutter having a rectilinear edge crossing the axis of revolution and constituting in any of its positions a rectilinear generatrix of one set of a hyperboloid of revolution struck around such axis and further comprising a stationary knife having a rectilinear edge constituting a generatrix of the other set of the same hyperboloid with continuously revolving feed rollers in front of such transverse cutter and of continuously revolving drawing off rollers in rear of such cutter, means for continuously supplying a main paper strip to such feed rollers, one of the continuously revolving feed rollers having a central cylindrical portion and end shoulders at its ends adapted to engage with the main paper strip, a guide roller adapted to enter between the said end shoulders, means for supplying an additional paper strip to the said guide roller, the width of such additional paper strip not exceeding the length of the cylindrical portion of the said shouldered feed roller, a spring actuated lever journalled in the frame and carrying at one end the said guide roller and at the other end a bowl, a cam journalled in the frame and adapted to co-operate with the said bowl, whereby the said guide roller is alternately pressed against and brought out of engagement with the central cylindrical part of the said shouldered feed roller, the angular speed of the said cam being a predetermined fraction of the angular speed of the last named feed roller, the said drawing off rollers being adapted to engage the paper strips supplied by the feed rollers before the paper strips are cut by the transverse cutter.

11. In a paper cutting machine the combination of means for feeding paper strips through such machine with a roller provided with ribs and punches and adapted to co-operate with a hollow counter roller provided with grooves corresponding to the said ribs and with holes corresponding to the said punches whereby the punchings resulting from the cooperation of the two rollers are fully separated from the strip and forced into the interior of the hollow roller, means for removing the said punchings from the hollow shaft and a transverse cutter comprising a rotary cutter having a rectilinear edge crossing the axis of revolution and constituting in any of its positions a rectilinear generatrix of one set of a hyperboloid of revolution struck around such axis and further comprising a stationary knife having a rectilinear edge constituting a generatrix of the other set of the same hyperboloid.

12. In a paper cutting machine the combination of means for feeding paper strips through such machine with a roller provided with ribs and punches and adapted to co-operate with a hollow counter roller provided with grooves corresponding to the said ribs and with holes corresponding to the said punches whereby the punchings resulting from the co-operation of the two rollers are fully separated from the strip and forced into the interior of the hollow roller, the said hollow roller increasing in diameter from the centre towards both ends of the hollow roller and a transverse cutter comprising a rotary cutter, having a rectilinear edge crossing the axis of revolution and constituting in any of its positions a rectilinear generatrix of one set of a hyperboloid of revolution struck around such axis and further comprising a stationary knife having a rectilinear edge constituting a generatrix of the other set of the same hyperboloid.

13. In a paper cutting machine the combination with transverse cutter, of paper feeding mechanism comprising a pair of feeding rollers in front of and a pair of drawing off rollers in rear of the transverse cutter, such transverse cutter comprising a rotary cutter having a rectilinear edge crossing the axis of revolution and constituting in any of its positions a rectilinear generatrix of one set of a hyperboloid of revolution struck around such axis and further comprising a stationary knife having a rectilinear edge constituting a generatrix of the other set of the same hyperboloid and variable speed gear for operating the rotary knife of the transverse cutter.

In testimony whereof I affix my signature.

FRIEDRICH LERNER.